2,410,451

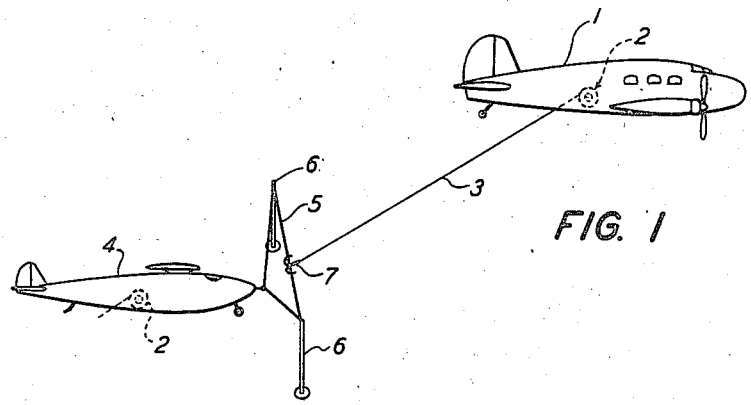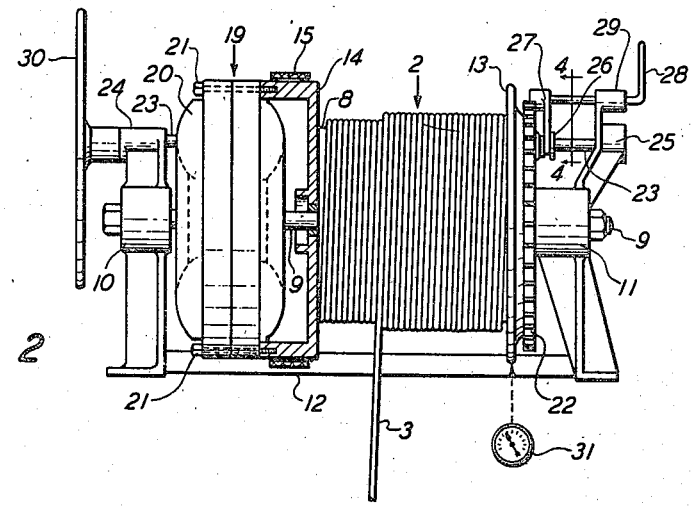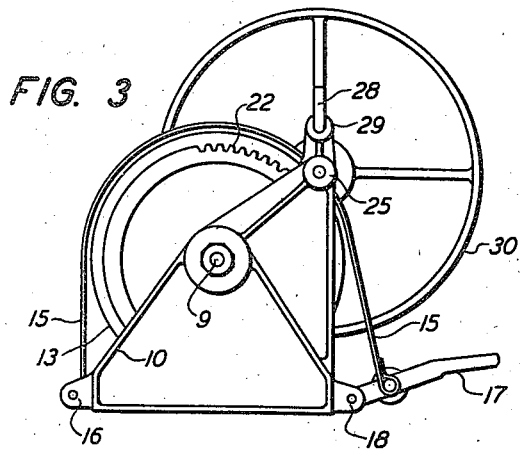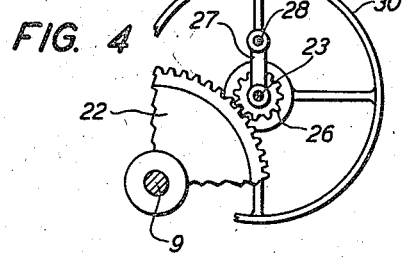
Nov. 5, 1946. M. E. LANDRY 2,410,451
AERIAL PICK-UP DEVICE
Filed June 26, 1942
FIG. 1
FIG. 2
FIG. 3
FIG. 4
INVENTOR
M. E. LANDRY
BY
ATTORNEY Patented Nov. 5, 1946

UNITED STATES PATENT OFFICE 2,410,451

AERIAL PICKUP DEVICE

Max E. Landry, Tulsa, Okla.

Application June 26, 1942, Serial No. 448,596

2 Claims. (Cl. 258—1.2)

This invention relates to improvements in aerial pick-up devices, and particularly to a hydraulically controlled reel for the pick-up cable normally employed in aircraft for picking up or dropping loads while the aircraft is in flight.

A primary object of this invention is to provide a cable reel and brake means which is shock-absorbing in character and which will effectively cushion or absorb the shock which normally occurs when the cable, trailing from an aircraft in flight, picks up a stationary load, to thereby prevent transmission of such shock to the structural members of the aircraft.

Numerous aerial pick-up devices have heretofore been designed, such, for example, as that disclosed in Ashley and Bahn U. S. Patent No. 1,755,235, dated April 22, 1930. Likewise various devices for absorbing pick-up shock, such as elastic and spring-controlled cords, have been devised and have been more or less successful when relatively light loads are to be picked up. However, in the past few years aeronautical science has developed the use of glider trains, wherein a powered aircraft is employed to tow trains composed of one or more motorless aircraft of the glider type. It has been found that several heavily loaded gliders may thus be towed by the powered plane to any desired destination where they may be released and brought to earth by the operators stationed in the gliders. Obviously when an aeroplane in flight attempts to pick up such heavy loads as are represented by one or more loaded gliders, a tremendous shock load will normally be transmitted to the grappling cable which may snap the cable or be transmitted to the structure of the towing craft with frequently destructive results. Under these conditions, it is obvious that elastic cords or spring-controlled shock absorbers of the more conventional types will be unlikely to withstand the relatively great shock loads involved.

Accordingly, it is an important aim of this invention to provide improved shock-absorbing means for the pick-up cable which will permit a tow-plane, while air-borne, to successfully pick up heavy loads from the ground.

In accordance with a general embodiment of this invention, a cable reel, which is mounted in the pick-up aircraft, is provided with a hydraulic braking means of the fluid-friction type which is so arranged and connected to the cable reel as to automatically and effectively absorb the shock on the cable without transferring it to the supporting aircraft. With such an arrangement, as the weight and inertia of the load is transferred to the pick-up cable, the cable will be unwound from the reel revolving the latter. The revolutions of the reel are transmitted to the elements of the hydraulic brake, which functions in the well-known manner characteristic of such devices, to develop power to quickly and smoothly brake the load and absorb the shock.

Additional objects and advantages of this invention will become apparent from the following detailed description when read in conjunction with the accompanying drawing which illustrates a form of apparatus in accordance with a general embodiment of this invention.

In the drawing:

Fig. 1 illustrates the general relationship of a powered pick-up aircraft to a towed glider which is about to be picked up, the position of the cable reel in the powered craft being indicated in dotted outlines thereon;

Fig. 2 is a front elevational view, partly in section, of a hydraulically controlled cable reel in accordance with this invention;

Fig. 3 is an end elevation of the right hand end of the structure shown in Fig. 2; and Fig. 4 shows a detail of the reel structure viewed along line 4—4 of Fig. 2.

Referring to the drawing and to Fig. 1 in particular, a powered aeroplane 1 is represented as in flight, having mounted within its fuselage the cable reel of this invention, designated generally by the numeral 2, from which a pick-up cable 3 has been let down preparatory to picking up a glider 4 from the ground. Glider 4 is shown attached to a pick-up loop 5 which is releasably suspended between a pair of supporting posts 6—6. Pick-up cable 3 is shown provided with a grappling hook 7 which is about to engage pick-up loop 5. When the pull of aeroplane 1 is applied through cable 3 to loop 5, the latter will be pulled from the supporting posts 6—6 and, as the aeroplane continues in flight, the glider will be launched and will remain connected to the tow-plane through the connection formed by loop 5 between the grapling hook and the glider. Such a pick-up loop and grappling hook arrangement for picking up loads by an aeroplane in flight is disclosed in the Ashley and Bahn patent above referred to. It will be understood that a pilot, normally stationed in the glider, may release the glider from its connection to the pick-up cable by any conventional form of release mechanism, whenever it is desired to deliver the glider at the destination to which it is brought by the tow-plane.

It will be understood that in picking up a loaded glider in the manner above described, heavy shock will be transmitted to the pick-up cable and towplane. Apparatus in accordance with this invention for eliminating or effectively cushioning such shock will be described hereinafter, having particular reference to Figs. 2, 3, and 4.

Referring to Fig. 2, cable reel 2 consists of a cable drum 8 on which cable 3 is wound. Drum 8 is rotatively mounted on a shaft 9, the ends of which are mounted in upright support members 10 and 11 in which shaft 9 is fixed against rotation by any suitable means of conventional nature. Support members 10 and 11 are rigidly mounted on a suitable base structure 12 which is adapted to be rigidly fastened to suitable structural elements of the aeroplane structure. Cable drum 8 is provided with an annular flange 13 at one end and with an integrally formed, or rigidly attached, friction brake drum 14 at the opposite end. A friction brake band 15 is wound about brake drum 14, having one end anchored to base member 12 at 16 and the other end connected to a brake lever 17 which is pivotally connected to base member 12 at 18. Mounted on shaft 9 between brake drum 14 and support member 10 is a hydraulic coupling, designated generally by the numeral 19, of the well known fluid-friction type, having a shell 20 which is rotatable on shaft 9 and rigidly connected to brake drum 14 by means of bolts 21. The impeller element of the coupling (not shown) is fixedly mounted on shaft 9 and is enclosed within shell 20. This type of fluid-friction coupling is well known and in commercial use, as exemplified by the device known as "hydraulic power take-off," Model No. 14–HU–2, manufactured by Twin-Disc Clutch Co. of Racine, Wisconsin, which is well adapted for the purposes of this invention.

With this type of hydraulic coupling, it will be seen that by fastening the revolvable shell 20 to brake drum 14, shell 20 will revolve about shaft 9 as a unit with cable drum 8. The shell being filled with fluid, as is conventional, fluid friction will be developed therein by the relative movement of the shell and impeller and will develop braking power within the coupling. Since the impeller is stationary, the braking power developed will be in accordance with the speed of rotation of shell 20 and, therefore, in accordance with the speed of the cable drum to which the shell is rigidly united.

In operation, when the air-borne aeroplane first hooks on to pick-up loop 5, the load of glider 4 will come on cable 3. The latter will begin to unreel very rapidly from drum 8 causing the latter to rotate at a corresponding speed. Rotation of the drum will be transmitted to shell 20 of the coupling and will cause the latter to rapidly build up braking power in accordance with the usual characteristics of such devices and will absorb the shock of the load attached to the cable 3 through the dissipation of energy through the fluid in the coupling, and none of the shock will, therefore, be transferred to the aeroplane itself. When the full load has been taken up by the coupling, that is, when the glider has been launched and brought to flying speed, which will occur generally in a very few seconds depending largely upon the speed of the aeroplane, the weight of the loaded glider, and the diameter of drum 8, the cable drum and attached shell 20 will begin to lose speed. At this point, downward pressure will be applied to brake lever 17 to actuate the friction brake consisting of brake drum 14 and brake band 15. This will stop further rotation of the cable drum and will hold the glider in position behind the towing plane.

The friction brake may also be employed while the hydraulic brake is functioning to additionally control the braking of the load where desired. For example, where an excessive amount of cable may be unwinding, the friction brake may be gradually applied to slow the speed of the cable drum to thereby bring the drum to a stop before the drum end of the cable is reached.

A speedometer 31, or other suitable speed indicating device, is connected to a suitable point on cable reel 2 and is preferably placed in view of the tow-plane operator. From the speed indicated on speedometer 31, the operator will be advised whether or not the glider or other load has been picked up and also when the reel begins to lose speed, indicating that the full load has been taken by the hydraulic brake and the glider brought to flying speed. Upon receiving this indication of the loss of speed of the reel, the operator may apply the manual friction brake, as indicated above.

To permit the position of the glider to be adjusted relative to the tow plane, or to reel the cable in after the glider has been released, or to pay out cable preparatory to picking up a load, cable reel 2 is provided with an auxiliary winding arrangement for manual operation. This winding arrangement consists of a ring gear 22 which is rigidly connected to flange 13, but which is rotatable therewith on shaft 9. A pinion shaft 23 extends lengthwise of the cable reel along one side thereof and has its ends journalled in brackets 24 and 25 which are mounted on support members 10 and 11, respectively. A pinion 26 is splined to pinion shaft 23 in a conventional manner and is arranged to slide thereon into and out of engagement with ring gear 22, this movement being effected by means of a yoke 27 operated by a handle 28 which is slidably mounted in a bearing 29 carried on bracket 25. An operating wheel 30, mounted on the end of pinion shaft 23 outside bracket 24, serves as means for manually rotating the cable reel when pinion 26 and ring gear 22 are in mesh. It will be understood that during the operation of picking up a load on cable 3, pinion 26 will be disengaged from ring gear 22. Thereafter, when it is desired to take-up or pay out cable 3, pinion 26 will be engaged with ring gear 22 and the desired action of cable 3 will be effected by rotating wheel 30 in the indicated direction. When reeling of the cable has been completed, the auxiliary winding mechanism may be locked in any conventional manner or by keeping brake band 15 locked on brake drum 14.

An additional cable reel 2 may be installed in the towed glider, as indicated in dotted outlines in Fig. 1, for use in picking up any succeeding gliders which it may be desired to add to the train. By thus equipping each of the gliders as well as the tow-plane with shock-absorbing reels in accordance with this invention, an entire train of gliders may be successfully launched without undue shock to any section of the train. Furthermore, with such an arrangement, additional gliders may be picked up while the tow-plane and one or more gliders are already air-borne, the last glider in the train acting as the pick-up plane for the next glider in the same manner as previously described in connection with the aeroplane 1. The several glider pilots would perform such mechanical operations in their respective craft as are required for stopping the reels and adjusting the lengths of the cables.

It will be understood that the size and diameter of the cable drum 8 may be varied depending upon the load to be handled. The same will be true with regard to the size and braking capacity of the fluid-friction brake.

Various alterations and amendments may be made in the details of this invention without departing from the scope of the appended claims but within the spirit of this invention.

What I claim and desire to secure by Letters Patent is:

1. In an aerial pick-up device, a grappling line, means on the grappling line to connect it to a load to be picked up, a reel adapted to be carried by an aircraft and on which the grappling line is wound, the line being unwound from the reel and the reel being rotated by the force exerted on the cable by the load during a pick-up operation, a hydraulic brake having two relatively rotatable elements, one of which is connected to the reel, and means for holding the other of said elements against rotation whereby as the reel is rotated by the force exerted on the cable by the load the major part of the force will be absorbed by liquid in the brake.

2. In an aerial pick-up device, a grappling line, means on the grappling line to connect it to a load to be picked up, a reel adapted to be carried by an aircraft and on which the grappling line is wound, the line being unwound from the reel and the reel being rotated by the force exerted on the cable by the load during a pick-up operation, a hydraulic brake having two relatively rotatable elements, one of which is connected to the reel, means for holding the other of said elements against rotation whereby as the reel is rotated by the force exerted on the cable by the load the major part of the force will be absorbed by liquid in the brake, and mechanical brake means acting on the reel to hold it against rotation after its rate of rotation has been substantially reduced by the hydraulic brake.

MAX E. LANDRY.